US012709678B2

(12) United States Patent
Wu et al.

(10) Patent No.: US 12,709,678 B2
(45) Date of Patent: Aug. 18, 2026

(54) MATERIAL CAPABLE OF ACCELERATING DEGRADATION

(71) Applicant: Jiangsu Huibei New Materials Co., Ltd., Yancheng (CN)

(72) Inventors: Chunfeng Wu, Yancheng (CN); Cooper Bayliss, Yancheng (CN); Mingjian Liu, Yancheng (CN); Zhejun Huang, Yancheng (CN)

(73) Assignee: Jiangsu Huibei New Materials Co., Ltd., Yancheng (CN)

( * ) Notice: Subject to any disclaimer, the term of this patent is extended or adjusted under 35 U.S.C. 154(b) by 944 days.

(21) Appl. No.: 17/826,176

(22) Filed: May 27, 2022

(65) Prior Publication Data

US 2022/0289954 A1 Sep. 15, 2022

(30) Foreign Application Priority Data

Apr. 27, 2022 (CN) ........................ 202210451367.X

(51) Int. Cl.
*C08L 23/06* (2006.01)
*C08L 23/12* (2006.01)

(52) U.S. Cl.
CPC ............... *C08L 23/06* (2013.01); *C08L 23/12* (2013.01)

(58) Field of Classification Search
CPC ...... C08L 23/06; C08L 23/0815; C08L 91/00; C08L 23/12
See application file for complete search history.

(56) References Cited

U.S. PATENT DOCUMENTS

| | | | | |
|---|---|---|---|---|
| 8,658,069 | B2 * | 2/2014 | Auffermann | C08J 5/18 524/451 |
| 2007/0243350 | A1 * | 10/2007 | Forsberg | C08K 3/01 428/35.7 |
| 2015/0299432 | A1 * | 10/2015 | Scheirs | C08K 5/098 523/128 |
| 2015/0353419 | A1 | 12/2015 | Jose et al. | |
| 2019/0256413 | A1 | 8/2019 | Jose et al. | |
| 2020/0239362 | A1 | 7/2020 | Jose et al. | |

FOREIGN PATENT DOCUMENTS

CN 102372858 A * 3/2012

OTHER PUBLICATIONS

Guopeng et al. (Polymer 154 (2018) 119-127 (Year: 2018).*
English Machine Translation of CN-102372858 (Year: 2012).*

* cited by examiner

*Primary Examiner* — Catherine S Branch
*Assistant Examiner* — Olga Lucia Donahue
(74) *Attorney, Agent, or Firm* — Snell & Wilmer (LA)

(57) ABSTRACT

The present disclosure relates to the technical field of novel materials. Through the addition of the biodegradable material and the nano calcium carbonate, the degradation rate of the novel material capable of accelerating degradation can be effectively improved; the ductility and elongation at break of plastics are improved by adding the biodegradable material. The novel material capable of accelerating degradation has good heat resistance and impact property, also has excellent biodegradability, is capable of effectively promoting microbial growth, facilitating the crushing of biodegradable plastics and further degrading the plastics into small molecule compounds, and can increase the degradation rate of the novel material in soil.

16 Claims, 2 Drawing Sheets

MATERIAL CAPABLE OF ACCELERATING DEGRADATION

TECHNICAL FIELD

The present disclosure relates to the technical field of novel materials, and particularly relates to a novel material capable of accelerating degradation.

BACKGROUND

Novel materials refer to emerging and developing materials with excellent properties and special functions that traditional materials do not have, or materials formed due to a fact that the traditional materials have obviously improved properties and generate new functions by adopting a new technology (processes and equipment). Generally, some key materials meeting development requirements of high technology industries belong to the scope of the novel materials as well.

Treatment modes of plastics mainly include recycling, burying and incineration. In reality, there are a few of plastics to be recycled, most of the plastics are incinerated or buried after being wasted, however, plastic wastes are difficultly decomposed, can occupy lots of spaces after being buried, waste gases generated by incineration are more prone to severe environmental pollution. Furthermore, the existing degradable materials can also cause environmental pollution due to low degradation rate.

SUMMARY

In view of the defects in the prior art, the present disclosure provides a novel material capable of accelerating degradation, thereby solving the problem that the existing degradable materials can also cause environmental pollution due to low degradation rate.

In order to realize the above objective, the present disclosure is realized by the following technical solution: provided is a novel material capable of accelerating degradation, comprising the following stocks in percentage by weight: 40-60% of raw material, 40-60% of nano calcium carbonate, 1% of biodegradable materials, 10-30% of degrading agents, 10-20% of compatilizers and 30-50% of plant fibers.

Preferably, the novel material capable of accelerating degradation comprises the following stock compositions in percentage by weight: 40% of raw materials, 60% of nano calcium carbonate, 1% of biodegradable materials, 10% of degrading agents, 10% of compatilizers and 30% of plant fibers.

Preferably, the novel material capable of accelerating degradation comprises the following stock compositions in percentage by weight: 40% of raw materials, 60% of nano calcium carbonate, 1% of biodegradable materials, 30% of degrading agents, 20% of compatilizers and 50% of plant fibers.

Preferably, the novel material capable of accelerating degradation comprises the following stock compositions in percentage by weight: 60% of raw materials, 40% of nano calcium carbonate, 1% of biodegradable materials, 10% of degrading agents, 10% of compatilizers and 30% of plant fibers.

Preferably, the novel material capable of accelerating degradation comprises the following stock compositions in percentage by weight: 60% of raw materials, 40% of nano calcium carbonate, 1% of biodegradable materials, 30% of degrading agents, 20% of compatilizers and 50% of plant fibers.

Preferably, the biodegradable material comprises the following stocks in percentage by weight: 8-20% of polyactic acid, 5-10% of (polybutylene adipate terephthalate (PBAT), 10-20% of polybutylene succinate, 10-20% of polyhydroxyalkanoate and 5-10% of aliphatic polyesters.

Preferably, the raw material is one of polypropylene and polyethylene, and the PBAT is a copolymer of butanediol adipate and butanediol terephthalate.

Preferably, the plant fiber is obtained by extracting a combination of one or more of flaxes, ramies, jutes and bamboo fibers, the degrading agent comprises one or more of a biodegrading agent and an optical degrading agent, and the compatilizer comprises one or more of an ethylene-acrylic acid copolymer, an ethylene-vinyl cerotate copolymer, an ethylene-butyl acrylate copolymer, waste proteins, celluloses and citric acid.

Preferably, a method for preparing the novel material specifically comprises the following steps:

S1, preparation of a biodegradable material: pouring appropriate amounts of polylactic acid, PBAT and polybutylene succinate into a mixer to be mixed for 20-30 min at a mixing temperature of 60-80° C., then adding appropriate amounts of polyhydroxyalkanoates and aliphatic polyesters, continuing to mix the above materials for 30 min, and then drying the obtained mixture for 1-2 h at a drying temperature of 40-60° C. so as to obtain the biodegradable material;

S2, treatment of plant fibers: performing sterilization and impurity removal treatment on an appropriate amount of extracted plant fibers, then grinding the plant fibers in a grinder, then screening the grinded plant fibers via a 200-mesh sieve, then digesting the screened plant fibers in a digester for a period of time, and then repeatedly beating the digested plant fibers after being fished out until being colloidal;

S3, mixing of materials: mixing appropriate amounts of raw materials, nano calcium carbonate, a degrading agent, a compatibilizer, the plant fibers obtained in step S2 and the biodegradable material obtained in step S1 in a high-speed mixer at a raised temperature of 50-85° C.;

S4, extrusion: adding the mixed material into a twin-screw extruder via a feeding machine to be extruded and pelleted; and

S5, film blowing: performing film blowing on the particles obtained in step S4 using a single-screw extruder to obtain a novel material with a film thickness of 15 ±2 to 25 ±3 gm.

BENEFICIAL EFFECTS

Compared with the existing technologies, the novel material capable of accelerating degradation provided by the present disclosure has the following beneficial effects: the novel material capable of accelerating degradation comprises the following stocks in percentage by weight: 40-60% of raw materials, 40-60% of nano calcium carbonate, 1% of biodegradable materials, 10-30% of degrading agents, 10-20% of compatilizers and 30-50% of plant fibers, the biodegradable material comprises the following stocks in percentage by weight: 8-20% of polyactic acid, 5-10% of PBAT, 10-20% of polybutylene succinate, 10-20% of polyhydroxyalkanoate and 5-10% of aliphatic polyesters; through the addition of the biodegradable material and the nano calcium carbonate, the degradation rate of the novel material capable of accelerating degradation can be effectively improved; the ductility and elongation at break of plastics are improved by adding the biodegradable material; the novel material capable of accelerating degradation has good heat resistance and impact property, also has excellent biodegradability, is capable of effectively promoting microbial growth, facilitating the crushing of biodegradable plastics and further degrading the plastics into small molecule compounds, and can increase the degradation rate of the novel material in soil; the polyethylene polymer is damaged through biological fission so that monomers are formed, and CO2 and water are finally generated.

DETAILED DESCRIPTION

Next, technical solutions in embodiments of the present disclosure will be clearly and completely described in combination with drawings in embodiments of the disclosure. Obviously, the described embodiments are only a part of embodiments of the present disclosure but not all the embodiments. Other embodiments obtained by persons of ordinary skill in the art without creative efforts are all included within the protective scope of the present disclosure.

Figure 1:
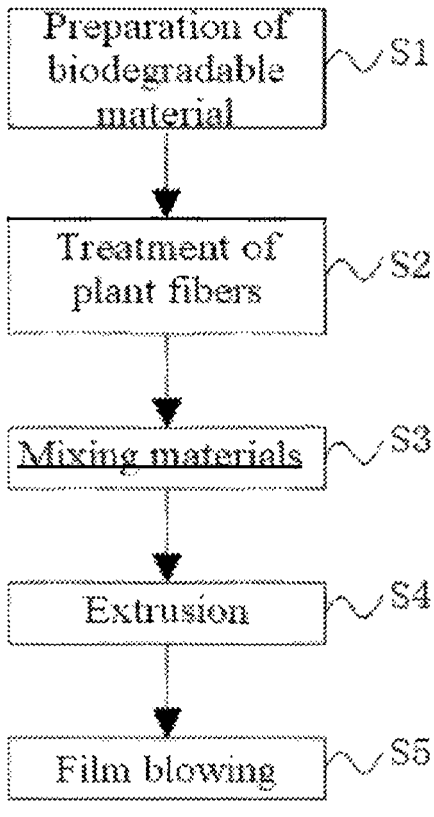
FIG. 1 is a step flowchart of the present disclosure.

Please refer to Fig.1, the present disclosure provides four technical solutions: one is to provide a novel material capable of accelerating degradation, comprising the following stocks in percentage by weight: 40-60% of raw materials, 40-60% of nano calcium carbonate, 1% of biodegradable materials, 10-30% of degrading agents, 10-20% of compatilizers and 30-50% of plant fibers.

In the present disclosure, the novel material capable of accelerating degradation comprises the following stock compositions in percentage by weight: 40% of raw materials, 60% of nano calcium carbonate, 1% of biodegradable materials, 10% of degrading agents, 10% of compatilizers and 30% of plant fibers.

In the present disclosure, the novel material capable of accelerating degradation comprises the following stock compositions in percentage by weight: 40% of raw materials, 60% of nano calcium carbonate, 1% of biodegradable materials, 30% of degrading agents, 20% of compatilizers and 50% of plant fibers.

In the present disclosure, the novel material capable of accelerating degradation comprises the following stock compositions in percentage by weight: 60% of raw materials, 40% of nano calcium carbonate, 1% of biodegradable materials, 10% of degrading agents, 10% of compatilizers and 30% of plant fibers.

In the present disclosure, the novel material capable of accelerating degradation comprises the following stock compositions in percentage by weight: 60% of raw materials, 40% of nano calcium carbonate, 1% of biodegradable materials, 30% of degrading agents, 20% of compatilizers and 50% of plant fibers.

In the present disclosure, the biodegradable material comprises the following stocks in percentage by weight: 8-20% of polyactic acid, 5-10% of PBAT, 10-20% of polybutylene succinate, 10-20% of polyhydroxyalkanoate and 5-10% of aliphatic polyesters.

In the present disclosure, the raw material is one of polypropylene and polyethylene, and the PBAT is a copolymer of butanediol adipate and butanediol terephthalate.

In the present disclosure, the plant fiber is obtained by extracting a combination of one or more of flaxes, ramies, jutes and bamboo fibers, the degrading agent comprises one or more of a biodegrading agent and an optical degrading agent, and the compatilizer comprises one or more of an ethylene-acrylic acid copolymer, an ethylene-vinyl cerotate copolymer, an ethylene- butyl acrylate copolymer, waste proteins, celluloses and citric acid.

In the present disclosure, a method for preparing the novel material specifically comprises the following steps:

Example 1

S1, preparation of a biodegradable material: 8% of polylactic acid, 5% of PBAT and 10% of polybutylene succinate were poured into a mixer to be mixed for 20 min at a mixing temperature of 60° C., then 10% of polyhydroxyalkanoates and 5% of aliphatic polyesters were added to continue to be mixed for 30 min, and then the obtained mixture was dried for 1 h at a drying temperature of 40° C. so as to obtain the biodegradable material;

S2, treatment of plant fibers: sterilization and impurity removal treatment was performed on 30% of extracted plant fibers, then the plant fibers were grinded in a grinder, then the grinded plant fibers were screened via a 200-mesh sieve, the screened plant fibers were then digested in a digester for a period of time, and then the digested plant fibers were fished out and repeatedly beaten until being colloidal;

S3, mixing of materials: 40% of raw materials, 40% of nano calcium carbonate, 10% of degrading agents, 10% of compatibilizers, 30% of plant fibers obtained in step S2 and 1% of biodegradable materials obtained in step S1 were mixed in a high-speed mixer at a raised temperature of 50° C.;

S4, extrusion: the mixed material was added into a twin-screw extruder via a feeding machine to be extruded and pelleted; and S5, film blowing: film blowing was performed on the particles obtained in step S4 using a single-screw extruder to obtain a novel material with a film thickness of 13 μm.

Example 2

S1, preparation of a biodegradable material: 20% of polylactic acid, 10% of PBAT and 20% of polybutylene succinate were poured into a mixer to be mixed for 30 min at a mixing temperature of 80° C., then 20% of polyhydroxyalkanoates and 10% of aliphatic polyesters were added to continue to be mixed for 30 min, and then the obtained mixture was dried for 2 h at a drying temperature of 60° C. so as to obtain the biodegradable material;

S2, treatment of plant fibers: sterilization and impurity removal treatment was performed on 50% of extracted plant fibers, then the plant fibers were grinded in a grinder, then the grinded plant fibers were screened via a 200-mesh sieve, the screened plant fibers were then digested in a digester for a period of time, and then the digested plant fibers were fished out and repeatedly beaten until being colloidal;

S3, mixing of materials: 40% of raw materials, 60% of nano calcium carbonate, 30% of degrading agents, 20% of compatibilizers, 50% of plant fibers obtained in step S2 and 1% of biodegradable materials obtained in step S1 were mixed in a high-speed mixer at a raised temperature of 85° C.;

S4, extrusion: the mixed material was added into a twin-screw extruder via a feeding machine to be extruded and pelleted; and S5, film blowing: film blowing was performed on the particles obtained in step S4 using a single-screw extruder to obtain a novel material with a film thickness of 22 μm.

Example 3

S1, preparation of a biodegradable material: 8% of polylactic acid, 5% of PBAT and 10% of polybutylene succinate were poured into a mixer to be mixed for 20 min at a mixing temperature of 60° C., then 10% of polyhydroxyalkanoates and 5% of aliphatic polyesters were added to continue to be mixed for 30 min, and then the obtained mixture was dried for 1 h at a drying temperature of 40° C. so as to obtain the biodegradable material;

S2, treatment of plant fibers: sterilization and impurity removal treatment was performed on 30% of extracted plant fibers, then the plant fibers were grinded in a grinder, then the grinded plant fibers were screened via a 200-mesh sieve, the screened plant fibers were then digested in a digester for a period of time, and then the digested plant fibers were fished out and repeatedly beaten until being colloidal;

S3, mixing of materials: 60% of raw materials, 40% of nano calcium carbonate, 10% of degrading agents, 10% of compatibilizers, 30% of plant fibers obtained in step S2 and 1% of biodegradable materials obtained in step S1 were mixed in a high-speed mixer at a raised temperature of 50° C.;

S4, extrusion: the mixed material was added into a twin-screw extruder via a feeding machine to be extruded and pelleted; and S5, film blowing: film blowing was performed on the particles obtained in step S4 using a single-screw extruder to obtain a novel material with a film thickness of 13 μm.

Example 4

S1, preparation of a biodegradable material: 20% of polylactic acid, 10% of PBAT and 20% of polybutylene succinate were poured into a mixer to be mixed for 30 min at a mixing temperature of 80° C., then 20% of polyhydroxyalkanoates and 10% of aliphatic polyesters were added to continue to be mixed for 30 min, and then the obtained mixture was dried for 2 h at a drying temperature of 60° C. so as to obtain the biodegradable material;

S2, treatment of plant fibers: sterilization and impurity removal treatment was performed on 50% of extracted plant fibers after 50% of plant fibers were extracted, then the plant fibers were grinded in a grinder, then the grinded plant fibers were screened via a 200-mesh sieve, the screened plant fibers were then digested in a digester for a period of time, and then the digested plant fibers were fished out and repeatedly beaten until being colloidal;

S3, mixing of materials: 60% of raw materials, 40% of nano calcium carbonate, 30% of degrading agents, 20% of compatibilizers, 50% of plant fibers obtained in step S2 and 1% of biodegradable materials obtained in step S1 were mixed in a high-speed mixer at a raised temperature of 85° C.;

S4, extrusion: the mixed material was added into a twin-screw extruder via a feeding machine to be extruded and pelleted; and S5, film blowing: film blowing was performed on the particles obtained in step S4 using a single-screw extruder to obtain a novel material with a film thickness of 22 μm.

Meanwhile, all the contents that are not described in this specification in detail belong to the existing technology well-known by those skilled in the art.

Experimental data

Specific experimental data are seen in Table below:

| | 40% PP + 60% calcium film | 40% PP + 60% calcium film + biodegradable material | 60% PE + 40% calcium film | 60% PE + 40% calcium film + biodegradable material |
|---|---|---|---|---|
| Accumulative produced gas amount (ml) | 1877.1 | 11801.2 | 1287.9 | 15986.8 |
| Percentage of methane (%) | 41.3 | 50.1 | 47.5 | 48.7 |
| Amount of methane (ml) | 775.3 | 5917.4 | 611.6 | 8269.3 |
| Weight of methane (g) | 0.55 | 4.23 | 0.44 | 5.91 |
| Percentage of $CO_2$ (%) | 40.0 | 37.1 | 40.2 | 38.1 |
| Amount of $CO_2$ (ml) | 751.8 | 4381.1 | 517.2 | 6468.8 |
| Weight of $CO_2$ (g) | 1.48 | 8.61 | 1.02 | 12.71 |
| Weight of sample (g) | 20.0 | 20.0 | 20 | 20 |
| Theoretical weight of sample (g) | 6.9 | 6.9 | 10.3 | 10.3 |
| Weight for biodegradation (g) | 0.82 | 5.52 | 0.60 | 7.90 |
| Biodegradation rate (%) | 1.0 | 69.6 | −1.4 | 69.5 |
| Biodegradation after adjustment (%) | 1.1 | 76.7 | −1.5 | 76.7 |

Figure 2:
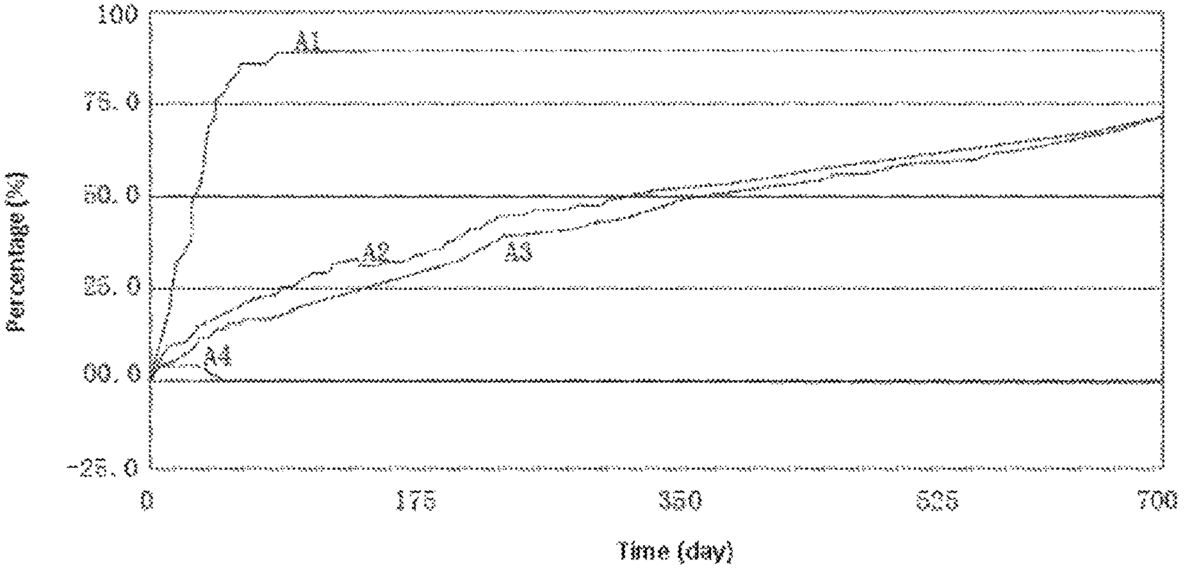
FIG. 2 is a diagram of degradation rate of the present invention.

FIG. 2 illustrates a diagram of degradation rate for four different mixtures of the material according to the invention. In FIG. 2, A1 represents 40% PP+60% calcium film; A2 represents 40% PP+60% calcium film+biodegradable material; A3 represents 60% PE+40% calcium film+biodegradable material; and A4 represents 60% PE+40% calcium film.

Experimental conclusions: through the addition of the biodegradable material and the nano calcium carbonate, the degradation rate of the novel material capable of accelerating degradation can be effectively improved; the ductility and elongation at break of plastics are improved by adding the biodegradable material; the novel material capable of accelerating degradation has good heat resistance and impact property, also has excellent biodegradability, is capable of effectively promoting microbial growth, facilitating the crushing of biodegradable plastics and further degrading the plastics into small molecule compounds, and can increase the degradation rate of the novel material in soil; the polyethylene polymer is damaged through biological fission so that form monomers are formed, and $CO_2$ and water are finally generated.

It is noted that in this paper, relational terms such as first and second are only used to distinguish one entity or operation from another entity or operation, and do not necessarily require or imply any such actual relationship or order between these entities or operations. Moreover, the terms "comprise", "include" or any other variation thereof are intended to cover non exclusive inclusion so that a process, method, article or equipment that includes a series of elements includes not only those elements, but also other elements not explicitly listed, or elements inherent in such process, method, article or equipment.

Although the embodiments of the present disclosure have been shown and described, it will be understood to those skilled in the art that a variety of changes, modifications, substitutions and modifications can be made to these embodiments without departing from the principle and spirit of the present disclosure, and the scope of the present disclosure is limited by the appended claims and their equivalents.

What is claimed is:

1. A material composition capable of accelerating degradation comprising:

a raw polymeric material;

a carbonate material;

a biodegradable material;

a degrading agent;

a compatibilizer material; and plant fibers;

wherein the biodegradable material comprises 8 to 20 percent by weight polylactic acid, 5 to 10 percent by weight polybutylene adipate terephthalate, 10 to 20 percent by weight polybutylene succinate, 10 to 20 percent by weight polyhydroxyalkanoates, and 5 to 10 percent by weight aliphatic polyesters based on the total weight of the biodegradable material.

2. The material composition of claim 1, wherein the raw polymeric material is selected from the group consisting of polypropylene, polyethylene, and combinations thereof.

3. The material composition of claim 1, wherein the raw polymeric material comprises 40 to 60 percent by weight of the total weight of the material composition.

4. The material composition of claim 1, wherein the carbonate material is nano calcium carbonate.

5. The material composition of claim 1, wherein the carbonate material comprises 40 to 60 percent by weight of the total weight of the material composition.

6. The material composition of claim 1, wherein the biodegradablematerial comprises 1 percent by weight of the total weight of the material composition.

7. The material composition of claim 1, wherein the degrading agent comprises 10 to 30 percent by weight of the total weight of the material composition.

8. The material composition of claim 1, wherein the degrading agent comprises one or more of a biodegrading agent and an optical degrading agent.

9. The material composition of claim 1, wherein the compatibilizer material comprises 10 to 20 percent by weight of the total weight of the material composition.

10. The material composition of claim 9, wherein the compatibilizer material comprises one or more of an ethylene-acrylic acid copolymer, an ethylene-vinyl cerotate copolymer, an ethylene-butyl acrylate copolymer, waste proteins, celluloses, and citric acid.

11. The material composition of claim 1, wherein the plant fibers comprise 10 to 20 percent by weight of the total weight of the material composition.

12. The material composition of claim 1, wherein the plant fibers comprise one or more of flaxes, ramies, jutes, and bamboo fibers.

13. A method of making the material composition of claim 1 comprising the steps of:

combining polylactic acid, polybutylene adipate terephthalate, polybutylene succinate, polyhydroxyalkanoate, and aliphatic polyester to form a mixture and drying the mixture to obtain the biodegradable material;

treating the plant fibers to be in a colloidal state; and combining and mixing together the raw polymeric material with the carbonate material, the degrading agent, the compatibilizer, the treated plant fibers, and the biodegradable material.

14. The method of claim 13, further comprising extruding and forming pelletized particles of the combined and mixed together materials.

15. The method of claim 14, further comprising film blowing the pelletized particles to obtain a material having a film thickness of 15±2 to 25±3 μm.

16. A material composition for accelerating degradation comprising:

a raw material comprising at least one of polypropylene or polyethylene;

a calcium carbonate material;

a biodegradable material comprising 8 to 20 percent by weight polylactic acid, 5 to 10 percent by weight polybutylene adipate terephthalate, 10 to 20 percent by weight polybutylene succinate, 10 to 20 percent by weight polyhydroxyalkanoates, and 5 to 10 percent by weight aliphatic polyesters based on the total weight of the biodegradable material;

a degrading agent comprising one or more of a biodegrading agent and an optical degrading agent;

a compatibilizer material comprising one or more of an ethylene-acrylic acid copolymer, an ethylene-vinyl cerotate copolymer, an ethylene-butyl acrylate copolymer, waste proteins, celluloses, and citric acid; and plant fibers comprising one or more of flaxes, ramies, jutes, and bamboo fibers.

* * * * *